(12) United States Patent
Miyaji

(10) Patent No.: US 6,575,862 B2
(45) Date of Patent: Jun. 10, 2003

(54) TOOTHED BELT POWER TRANSMISSION SYSTEM

(75) Inventor: Masaki Miyaji, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 31 days.

(21) Appl. No.: 09/782,872

(22) Filed: Feb. 14, 2001

(65) Prior Publication Data
US 2001/0014637 A1 Aug. 16, 2001

(30) Foreign Application Priority Data
Dec. 14, 2000 (JP) ........................ 2000-034644

(51) Int. Cl.[7] ................. F16G 1/28; F16G 5/20
(52) U.S. Cl. ...................... 474/205; 474/153
(58) Field of Search ................. 474/250, 205, 474/153, 148, 237, 251, 202, 204, 265, 203, 152

(56) References Cited

U.S. PATENT DOCUMENTS

| | | | | |
|---|---|---|---|---|
| 3,744,330 A | * | 7/1973 | Sugimoto | 474/153 |
| 4,403,979 A | * | 9/1983 | Wujick | 474/153 |
| 4,553,952 A | * | 11/1985 | Tangorra et al. | 474/153 |
| 4,929,221 A | * | 5/1990 | Tanaka et al. | 474/205 |
| 5,102,374 A | * | 4/1992 | Macchiarulo et al. | 474/205 |

FOREIGN PATENT DOCUMENTS

JP 60-40846 3/1985

* cited by examiner

Primary Examiner—Marcus Charles
(74) Attorney, Agent, or Firm—Dann, Dorfman, Herrell and Skillman; Henry H. Skillman

(57) ABSTRACT

A toothed belt power transmission system includes a toothed belt having evenly spaced teeth adapted to mesh with evenly spaced teeth on a toothed pulley for power transmission. The belt teeth have a curved engagement surface including a convexly arcuate tip portion and a concavely arcuate root portion that come in sliding contact with a concavely arcuate root portion and a convexly arcuate tip portion, respectively, of a curved engagement surface of the pulley teeth in such a manner that a space is defined between the confronting engagement surfaces of the belt and pulley teeth. By virtue of the space thus formed, air confined between the belt tooth and pulley tooth is allowed to escape in the transverse direction of the belt and does never produce bursting sound at the mesh of the belt tooth with the pulley tooth. In this instance, the air serves also as a pneumatic damper and thus suppresses the impact force.

10 Claims, 6 Drawing Sheets

TOOTHED BELT POWER TRANSMISSION SYSTEM

BACKGROUND OF THE INVENTION

1. Field of the Invention

The present invention relates to a toothed belt power transmission system including a toothed belt and a toothed pulley used in combination for performing power transmission in a phased power transmission mechanism between the crankshaft and camshaft of an engine, a roller conveyor mechanism of an article conveyance machine, a drive mechanism of a fabric sewing machine, and a drive mechanism of a printer.

2. Description of the Related Art

Toothed belt power transmitting systems comprised of a toothed belt and a toothed pulley, which are widely used for power transmission between a crankshaft and a camshaft of an engine, are generally classified into two groups; one using a rectilinear tooth profile having a flat engagement surface A1 on both teeth of a toothed belt and teeth of a toothed pulley, such as shown in FIG. 6A, and the other having a curvilinear tooth profile having a curved engagement surface A2 on both teeth of a toothed belt and teeth of a toothed pulley, such as shown in FIG. 6B (see Japanese Patent Publication No. Hei-5-70735).

The toothed belt power transmission system shown in FIG. 6A is able to achieve power transmission with high efficiency because a maximum contact area is available due to the flat engagement surfaces A1 of the toothed belt and pulley. However, to secure smooth meshing engagement between the toothed belt and pulley, a sufficiently large clearance or gap A3 must be provided between the tooth of the belt and the groove of the pulley. Due to the presence of such large clearance A3, the tip of a belt tooth is likely to be damaged or otherwise broken when subjected to an impact force applied at the mesh with a pulley tooth in a heavy-load high-speed operation. The broken tooth may cause considerably deterioration of the durability of the toothed belt and jumping of the pulley teeth, rendering the power transmitting operation unstable.

The toothed belt power transmission system shown in FIG. 6B can achieve smooth power transmitting operation because the respective engagement tooth surfaces A2 of the belt and pulley are curved so as to define therebetween a predetermined relatively small clearance extending from the root of a belt tooth toward the tip and terminating short of the belt tooth tip. However, at the onset of meshing engagement under heavy-load and high-speed operating condition, the curved engagement surface of a belt tooth is brought into contact with the curved engagement surface of a pulley tooth over the entire area thereof. This cause air to be trapped between the curved engagement surfaces and finally produce a bursting sound, thereby increasing the operation noise of the power transmission system. Additionally, root and tip portions of the belt tooth are susceptible to wear and cracking due to abrasion and friction heat concentrated thereto. This results in considerable reduction of the durability and wear-resistance of the toothed belt.

SUMMARY OF THE INVENTION

It is accordingly an object of the present invention to provide a toothed belt power transmission system which is capable of suppressing a shock at the mesh of a toothed belt with a toothed pulley under heavy-load and high-speed operating condition, can reduce meshing noise, and is able to improve the durability of the toothed belt.

To achieve the foregoing object, a toothed belt power transmission system according to the present invention comprises: a toothed pulley having evenly spaced pulley teeth on a peripheral surface thereof, each of the pulley teeth having a curved engagement surface on a side thereof, the curved engagement surface including a concavely arcuate root portion and a convexly arcuate tip portion located respectively adjacent to a root spaced from the outer periphery and a crest adjacent the outer periphery of the pulley tooth, the pulley teeth each having a pressure angle formed at the engagement surface; and a toothed belt having evenly spaced belt teeth on one surface thereof, each of the belt teeth having a curved engagement surface on a side thereof adapted to engage the curved engagement surface of one pulley tooth for power transmission between the toothed pulley and the toothed belt, the curved engagement surface of each belt tooth including a convexly arcuate tip portion and a concavely arcuate root portion located respectively adjacent to a crest and a root of the belt tooth, the convexly arcuate tip portion and concavely arcuate root portion of the belt tooth being slidably engageable with the concavely arcuate root portion and convexly arcuate tip portion, respectively, of the pulley tooth, the belt teeth each having a pressure angle formed at the engagement surface, the pressure angle of the belt teeth being slightly greater than the pressure angle of the pulley teeth.

At the onset of meshing engagement between one belt tooth and a mating pulley tooth, the convexly arcuate tip portion and concavely arcuate root portion of the belt tooth are in sliding contact with the concavely arcuate root portion and convexly arcuate tip portion, respectively, of the pulley tooth in such a manner that the confronting engagement surfaces of the belt tooth and pulley tooth partially separate from each other to define therebetween a space opening at opposite ends in the transverse direction of the toothed belt.

By thus formed space, air confined between the belt tooth and the pulley tooth is allowed to escape and does never produce a bursting sound. This reduces the meshing noise generated when the toothed belt meshes with the toothed pulley under heavy-load high-speed operating conditions. Additionally, since the space formed between the confronting engagement surfaces of the engaging belt and pulley teeth achieves a certain cushioning effect at the onset of meshing engagement, a meshing impact force acting on the contacting engagement surface portions of the belt and pulley teeth is pneumatically dampened. This improves the durability of the toothed belt.

As the meshing engagement advances, the rubber at the slidably contacting engagement surface portions (tip and root portions) of the belt tooth gradually deforms to follow or assume the profile of the engagement surface of the pulley tooth. This condition continues throughout the power transmitting operation between the mating pair of belt and pulley teeth. During the power transmitting operation, the engagement surface of the belt tooth elastically deformed arcuately about the intermeshing line engages the engagement surface of the pulley tooth over the entire area thereof. Thus, the belt teeth of the present invention are substantially free from damage such as a break or a crack which may otherwise occur at the convexly arcuate tip portion or the concavely arcuate root portion as in the conventional toothed belt. The toothed belt of the present invention is highly durable and is able to reduce power transmission loss during a heavy-load high-speed operation.

The crest of the belt teeth may be a flat surface or may have a dimple so as to facilitate elastic deformation of the belt tooth when the belt tooth comes in complete mesh with the mating pulley teeth. The belt tooth having such dimple contributes to further reduction of meshing noise.

In one preferred form of the invention, the convexly arcuate tip portion and concavely arcuate root portion of the belt tooth merge together without forming an angle therebetween, and the concavely arcuate root portion and convexly arcuate tip portion of the pulley tooth merge together without forming an angle therebetween. The arcuate portions may be a circular arcuate surface, a quadric surface or a parabolic surface.

It is preferable that the convexly arcuate tip portion of the pulley tooth is described by a circular arc, and the concavely arcuate root portion of the belt tooth is described by a circular arc having a radius of curvature slightly greater than that of the circular arc of the convexly arcuate tip portion of the pulley tooth.

The above and other objects, features and advantages of the present invention will become manifest to those versed in the art upon making reference to the following description and accompanying sheets of drawings in which certain preferred structural embodiments incorporating the principle of the invention are shown by way of illustrative example.

DETAILED DESCRIPTION OF THE PREFERRED EMBODIMENTS

The following description is merely exemplary in nature and is in no way intended to limit the invention or its application or use.

Figure 1:
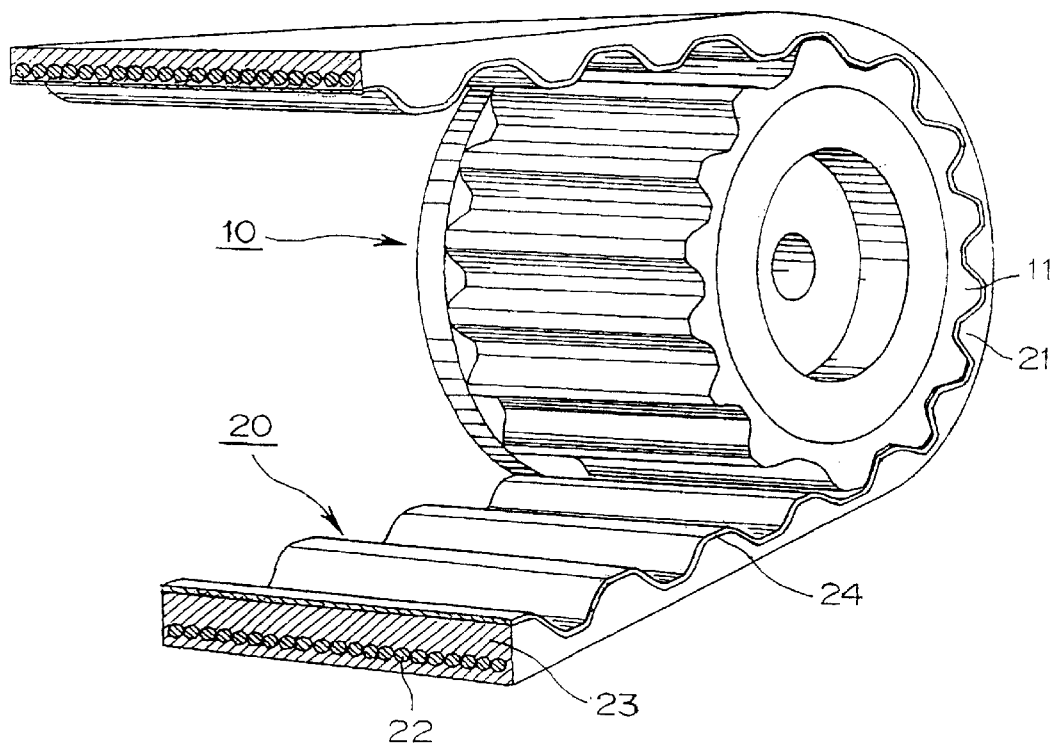
FIG. 1 is a perspective view showing the general construction of a toothed belt power transmission system according to a first embodiment of the present invention.

Referring now to the drawings and FIG. 1 in particular, there is shown in perspective a toothed belt power transmission system according to a first embodiment of the present invention. The power transmission system generally comprises a toothed pulley 10 disposed on both a driving side and a driven side of the power transmission system, and a toothed belt 20 trained around the toothed pulleys, 10 (one being shown) for power transmission between the driving side and the driven side. The pulley 10 has evenly spaced teeth 11 on its peripheral surface, and the belt 20 has evenly spaced teeth 21 on the bottom surface that mesh with grooves between the teeth of the pulley 10. In FIG. 1, reference numeral 22 denotes reinforcing cords made of glass fiber and so on, numeral 23 denotes a tooth rubber, and numeral 24 denotes a jacket made of fabric.

Figure 2:
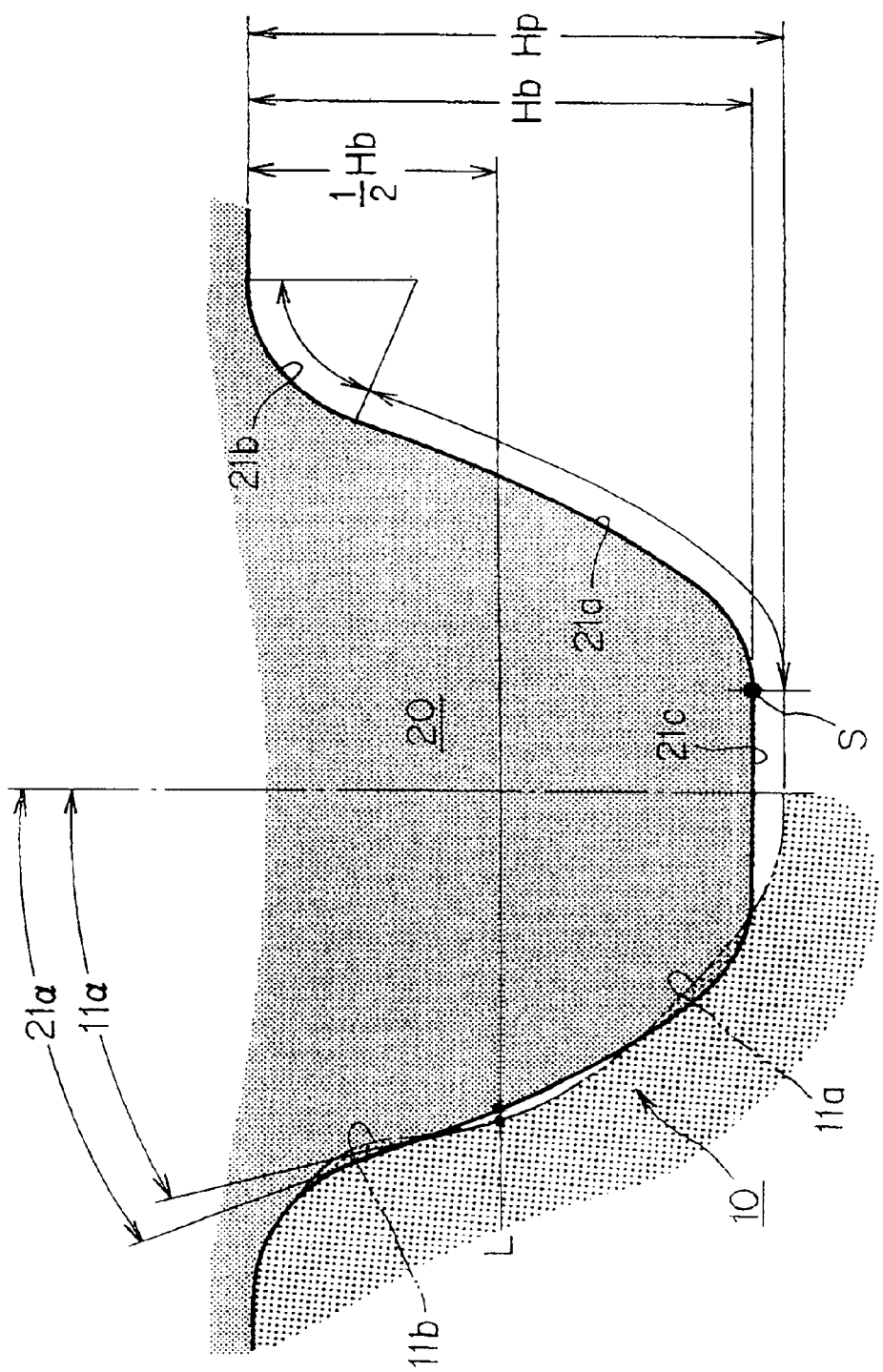
FIG. 2 is an enlarged view showing the tooth profiles of a toothed belt and a fragment of a toothed pulley of the power transmission system.

The teeth 21 of the toothed belt 20 has a tooth profile as described below with reference to FIG. 2. As shown in FIG. 2, the belt tooth 21 has a curved engagement surface (also called "side face" or "flank") composed of a convexly arcuate tip portion 21a and a concavely arcuate root portion 21b respectively adapted for sliding contact with a concavely arcuate root portion 11a and a convexly arcuate tip portion 11b of an engagement surface of the pulley tooth 11 (indicated by phantom lines). The convexly arcuate tip portion 21a forms a major part of the engagement surface (side face) of the belt tooth 21. The convexly arcuate tip portion 21a and the concavely arcuate root portion 21b are joined or blended together smoothly so as not to form an angle therebetween. The belt tooth 21 has a crest comprised of a flat surface 21c.

The convexly arcuate tip portion 21a of the belt tooth surface is a quadric surface that can be described by an equation of the second degree with an end edge of the flat tooth crest 21c regarded as a reference point S. The concavely arcuate root portion 21b of the belt tooth surface has a curvature described by a circular arc of a radius of curvature so determined as to secures sliding contact between the concavely arcuate root portion 21b and the convexly arcuate tip portion 11b of the pulley tooth surface. More concretely, the radius of curvature of the circular arc of the concavely arcuate root portion 21b is slightly larger than that of the convexly arcuate tip portion 11b of the pulley tooth 11.

The belt tooth 21 has a pressure angle 21α formed the engagement surface (side face) thereof, which is slightly larger than the pressure angle 11α formed on the engagement surface (side face) of the pulley tooth 11. The difference between the pressure angles 21α and 11α is determined such that at the onset of the meshing engagement, the engagement surface of a belt tooth 21 and the engagement surface of a mating pulley tooth 11 have respective portions separate from each other so as to define therebetween a space. In the illustrated embodiment, the pressure angle 21α of the belt tooth 21 is 25.5°.

The term "pressure angle 21α" of the belt tooth 21 used herein represents an angle formed between a centerline of the belt tooth 21 and a line tangent to a point of intersection of an intermeshing line (line of action) L and the engagement surface (side face) located approximately at the midpoint of the whole tooth depth Hb of the belt tooth 21. Similarly, the term "pressure angle 11α" of the pulley tooth 11 used herein represents an angle formed between a centerline of the bottom land of the toothed pulley 10 and a line tangent to a point of intersection of the intermeshing line (line of action) L and the engagement surface (side face) located substantially midway of the whole tooth depth Hp of the pulley tooth 11.

Figure 3:
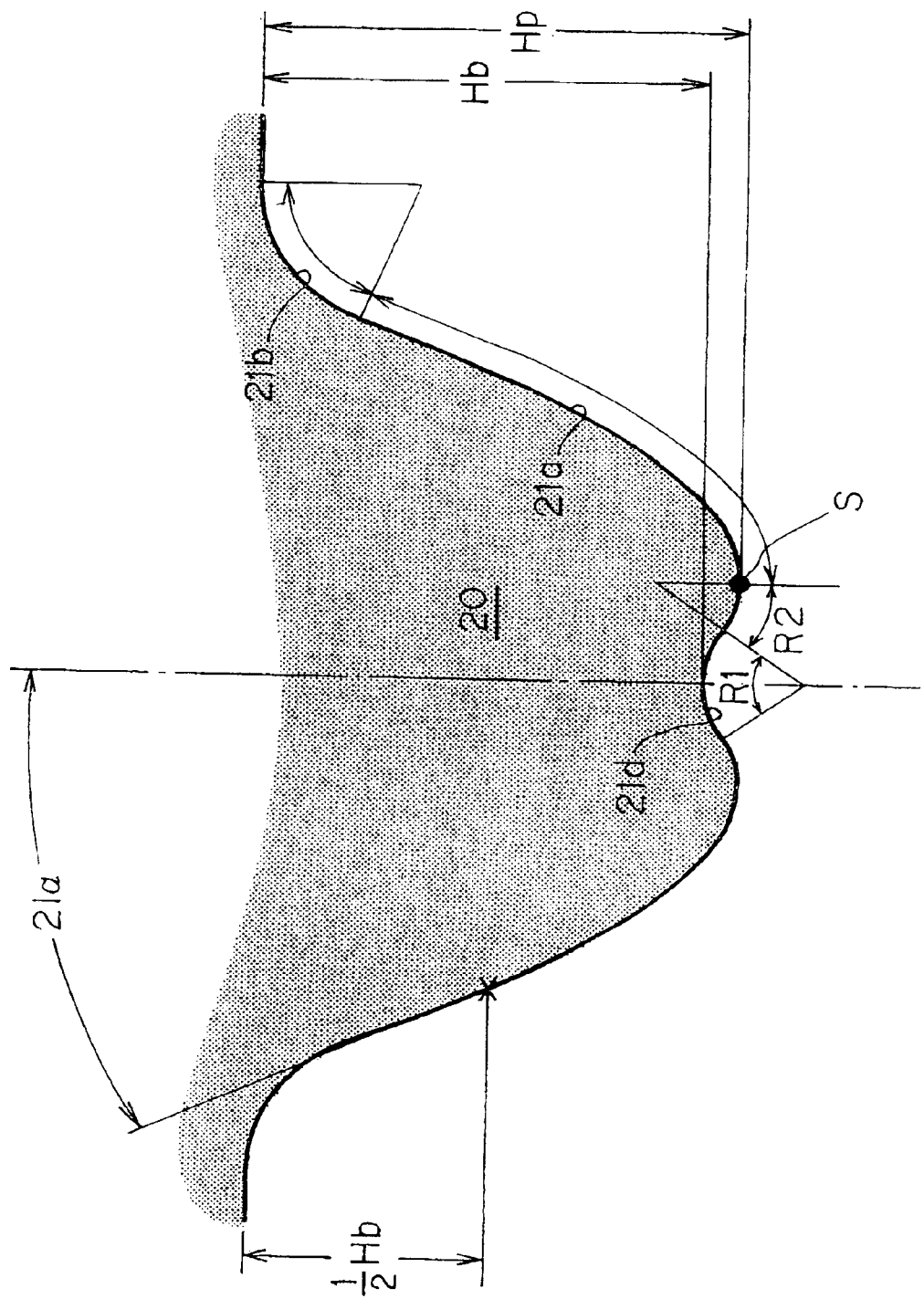
FIG. 3 is a view showing the tooth profile of a toothed belt according to a second embodiment of the present invention.

FIG. 3 shows the tooth profile of a modified belt tooth 21' according to the present invention. The modified belt tooth 21' has a dimple 21d formed in the crest thereof for absorbing an impact force or energy.

The tooth profile of the belt tooth 21' is the same as that of the belt tooth 21 shown in FIG. 2 except for the dimple 21d. Accordingly, like or corresponding parts are designated by the same reference characters, and a further description thereof will be omitted. The modified belt tooth 21' has a convexly arcuate tip portion 21a formed by a quadric surface described by an equation of the second degree with an end edge of the dimple 21d regarded as a reference point S.

As shown in FIG. 3, the dimple 21d is formed jointly by a convexly arcuate surface contiguous to the convexly arcuate tip portion 21a of the belt tooth surface, and a concavely arcuate surface located at the center of the tooth crest. The dimple 21d has a symmetric shape with respect to the centerline of the belt tooth 21'.

By virtue of the unique tooth profile described above, the toothed belt power transmission systems of the foregoing embodiments are able to accomplish various advantageous effects as described below, regardless of the presence of the dimple 21d, when they are used in a heavy-load high-speed operation.

Figure 6A:
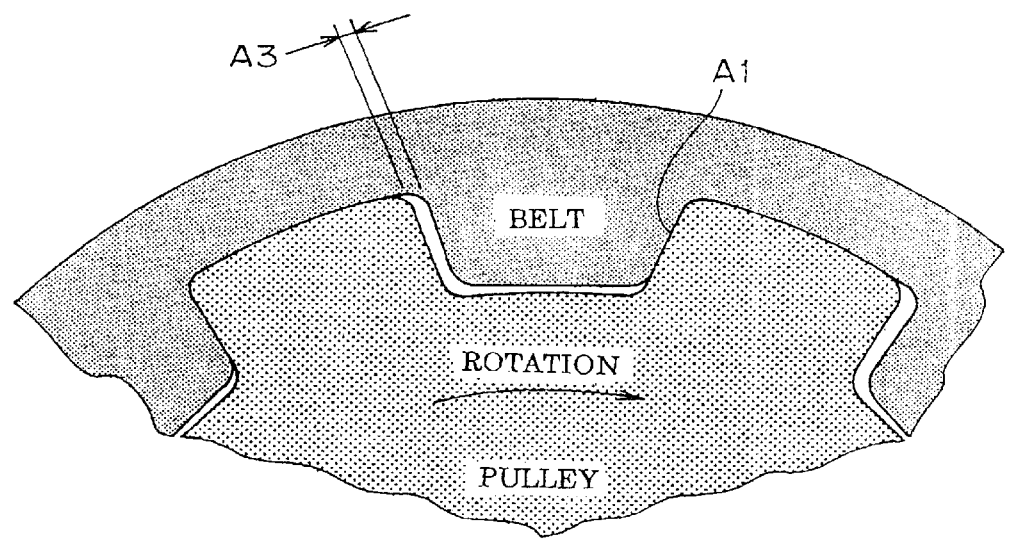
FIG. 6A is a fragmentary side view showing a conventional toothed belt power transmission system using flat engagement surfaces.
Figure 6B:
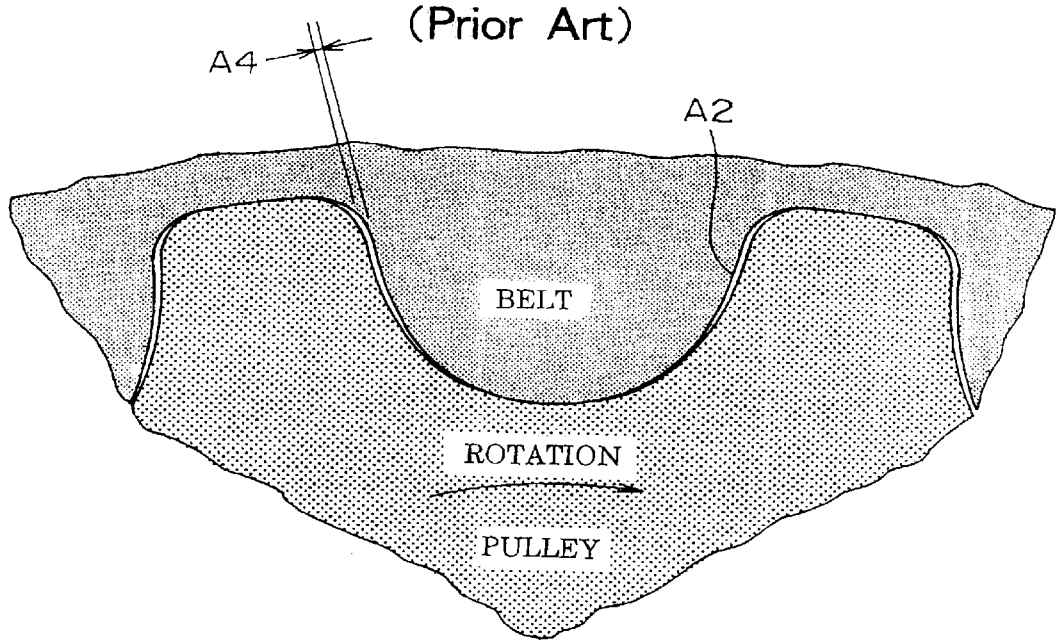
FIG. 6B is a view similar to FIG. 6A, but showing another conventional toothed belt power transmission system having curved engagement surfaces.

At the onset of meshing engagement between the toothed belt 20 and the toothed pulley 10, the convexly arcuate tip portion 21a and concavely arcuate root portion 21b of one belt tooth 21 come into sliding contact with the concavely arcuate root portion 11a and the convexly arcuate tip portion 11b of a mating pulley tooth 11, respectively, in such a manner that respective tooth surface portions located in the vicinity of the intermeshing line (line of action) L confront each other with a space or gap defined therebetween. An impact force exerted at the mesh is born by sliding engagement between the tip and root portions 21a, 21b of the belt tooth 21 and the corresponding root and tip portions 11a, 11b of the mating pulley tooth 11, and the impact force is suppressed by a pneumatic damping action achieved by the air confined between the belt and pulley teeth 21, 11. The space or gap defined between the opposed tooth surfaces of the belt 20 and pulley 10 is shown between the lead lines for reference characters 11a and 11b in FIG. 2. The gap is open at opposite ends in the transverse direction of the toothed belt 20 (i.e., in the longitudinal direction of the teeth 11, 21 of the pulley 10 and belt 20). By thus formed clearance, air constrained between the opposed tooth surfaces of the engaging belt and pulley teeth 21 and 11 is allowed to escape through one or both of the open ends and does not produce a bursting sound as in the conventional toothed belt transmission system shown in FIG. 6B.

As the meshing engagement between the belt tooth 21 and the pulley tooth 11 further advances to achieve power transmission therebetween, the rubber 23 (FIG. 1) of the tip and root portions 21a, 21b of the belt tooth 21 undergoes elastic deformation to follow or assume the profile of the tooth surface of the pulley tooth 11. Thus, the engagement surface (side face) of the belt tooth 21 is deformed as a whole into a curvature bent arcuately about the intermeshing line L. The thus deformed engagement surface of the belt tooth 21 is complementary in profile to the engagement surface (side face) of the pulley tooth 11 and hence fits with the pulley's engagement surface over the entire area thereof. This ensures that power transmission between the belt tooth 21 and the pulley tooth 11 is achieved efficiently without causing local stress concentration on the convexly arcuate tip portion 21a or the concavely arcuate root portion 21b of the belt tooth 21. The tooth belt 20 of the present invention is, therefore, highly durable and has a long service life.

Figure 4:
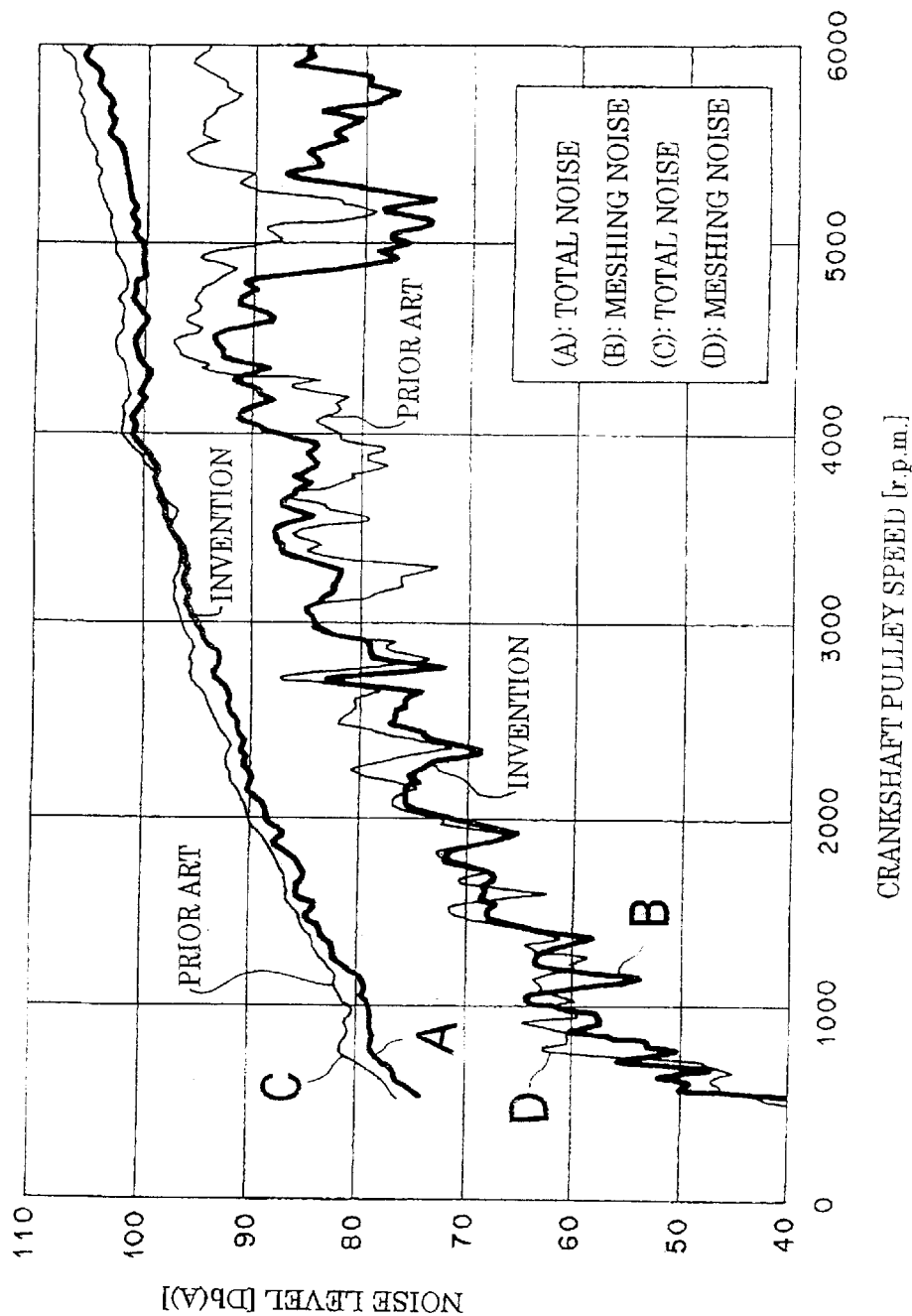
FIG. 4 is a graph showing the result of a noise test made in conjunction with the inventive toothed belt power transmission system and a conventional toothed belt power transmission system.

Using a known rotational degree ratio analyzing method, the toothed belt power transmission system of the present invention and a conventional toothed belt power transmission system were tested for operation noise with the result shown in FIG. 4. In the noise test, the total noise and meshing sound were collected by a highly directional microphone disposed 100 mm ahead of the crankshaft.

It appears clear from FIG. 4 that the inventive toothed belt power transmission system is superior to the conventional toothed belt power transmission system in the effect of reducing the total noise throughout the range of pulley speed tested, and it also shows a considerably high noise reduction effect under heavy-load high-speed conditions particularly at pulley speeds above 4500 r.p.m.

Figure 5A:
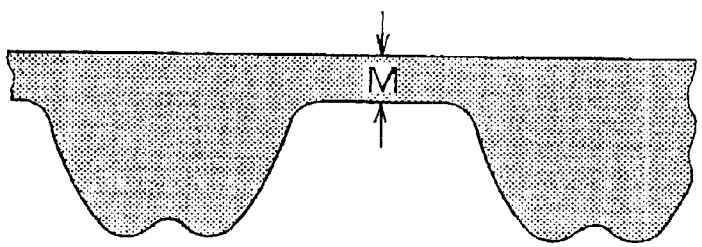
FIG. 5A is a schematic view showing a portion of the toothed belt used for measurement of the wear-resistance.
Figure 5B:
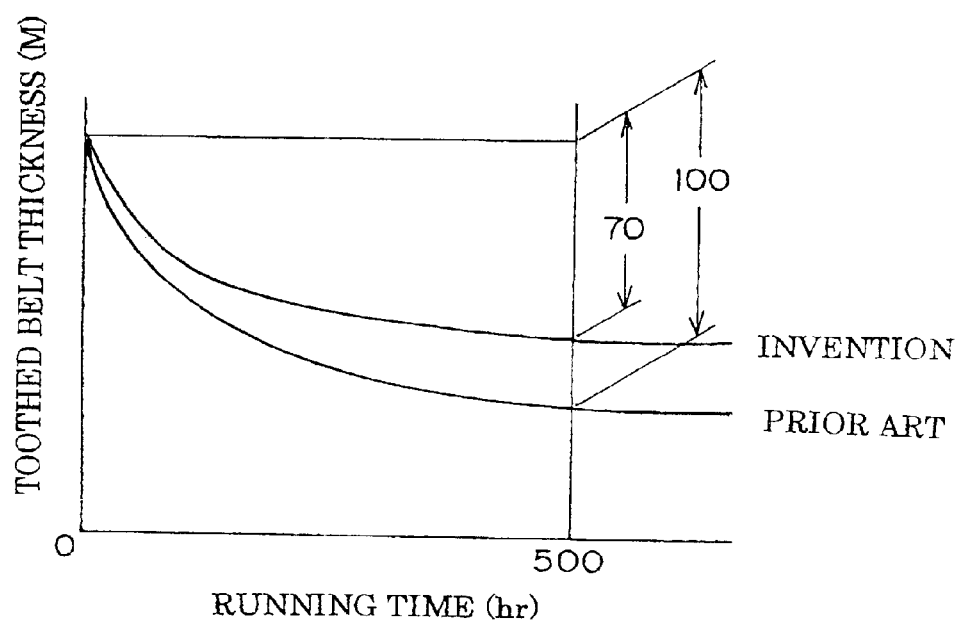
FIG. 5B is a graph showing the result of a measurement of the wear-resistance measurement.

The inventive and conventional toothed belt power transmission systems were also subjected to a wear-resistance test with the result shown in FIG. 5B. In the wear-resistance test, the thickness M (qual to the distance between the bottom land to the back face as shown in FIG. 5A) of each tested belt was measured after a 500-hours power transmitting operation achieved under a maximum belt tension at a pulley speed of 5000 r.p.m.

It appears clear from FIG. 5B that the amount of wear of the inventive toothed belt is reduced to about 70% of the amount of wear of the conventional toothed belt and hence is superior in wear resistance and durability to the conventional toothed belt.

As described above, the toothed belt power transmission systems of the present invention are able to elastically suppress impact energy and meshing sound produced under heavy-load and high-speed operating conditions, thus securing a higher degree of durability and a long service life of the toothed belt.

Various advantageous effects attained by the toothed belt power transmission system of the present invention are as follows.

At the start of meshing in a heavy-load high-speed operation, a convexly arcuate tip portion and a concavely arcuate root portion of the side face of one belt tooth come in sliding contact, respectively, with a concavely arcuate root portion and a convexly arcuate tip portion of the side face of a pulley tooth such that the confronting side faces of the engaging belt and pulley teeth defines therebetween a space opening at opposite ends in the transverse direction of the toothed belt. By thus formed space, air confined between the belt tooth and the pulley tooth is allowed to escape and does never produce a bursting sound. This reduces the meshing noise generated when the toothed belt meshes with the toothed pulley under heavy-load high-speed operating conditions.

Additionally, since the space formed between the confronting side faces of the engaging belt and pulley teeth achieves a certain cushioning effect at the onset of meshing engagement, a meshing impact force acting on the contacting side face portions of the belt and pulley teeth is pneumatically dampened. This improves the durability of the toothed belt.

As the meshing engagement advances, the rubber at the slidably contacting side face portions (tip and root portions) of the belt tooth gradually deforms to follow or assume the profile of the side face of the pulley tooth. This condition continues throughout the power transmitting operation. During the power transmitting operation, the side face of the belt tooth elastically deformed arcuately about the intermeshing line engages the side face of the pulley tooth over the entire area thereof. Thus, the belt teeth of the present invention are free from damage such as break or cracking which may otherwise occur at the convexly arcuate tip portion or the concavely arcuate root portion as in the conventional toothed belt. The toothed belt of the present invention is highly durable and is able to reduce power transmission loss during a heavy-load high-speed operation.

Obviously, various minor changes and modifications of the present invention are possible in the light of the above teaching. It is therefore to be understood that within the scope of the appended claims, the present invention may be practiced otherwise than as specifically described.

What is claimed is:

1. A toothed belt power transmission system comprising:
   a toothed pulley having evenly spaced pulley teeth on a peripheral surface thereof, each of the pulley teeth having a curved engagement surface on a side thereof, the curved engagement surface including a concavely arcuate root portion and a convexly arcuate tip portion located respectively adjacent to a root spaced from the outer periphery and a crest adjacent the outer periphery of the pulley tooth, the pulley teeth each having a pressure angle formed at the engagement surface; and
   a toothed belt having evenly spaced belt teeth on one surface thereof, each of the belt teeth having a curved engagement surface on a side thereof adapted to engage the curved engagement surface of one pulley tooth for power transmission between the toothed pulley and the toothed belt, the curved engagement surface of each belt tooth including a convexly arcuate tip portion and a concavely arcuate root portion located respectively adjacent to a crest and a root of the belt tooth, the convexly arcuate tip portion and concavely arcuate root portion of the belt tooth being slidably engageable with the concavely arcuate root portion and convexly arcuate tip portion, respectively, of the pulley tooth, the belt teeth each having a pressure angle formed at the engagement surface, the pressure angle of the belt teeth being slightly greater than the pressure angle of the pulley teeth;
   when said belt is meshed with said pulley, said concavely arcuate root portion and said convexly arcuate tip portion of each meshed pulley tooth providing an engagement surface on the side face of the pulley tooth engaging said curved engagement surface of the meshing belt tooth at two lines, so as to form a gap in the spacing between said root portion and said tip portion between said lines,
   said pulley tooth having a depth greater than the depth of the belt tooth, said gap being formed substantially midway of the depth of the pulley tooth.

2. A toothed belt power transmission system according to claim 1, wherein the crest of the belt teeth comprises a flat surface.

3. A toothed belt power transmission system according to claim 1, wherein the crest of the belt teeth has a dimple so as to facilitate elastic deformation of the belt tooth when the belt tooth comes in complete mesh with the mating pulley teeth.

4. A toothed belt power transmission system according to claim 1, wherein the convexly arcuate tip portion and concavely arcuate root portion of the belt tooth merge together without forming an angle therebetween, and the concavely arcuate root portion and convexly arcuate tip portion of the pulley tooth merge together without forming an angle therebetween.

5. A toothed belt power transmission system according to claim 4, wherein the convexly arcuate tip portion of the pulley tooth is described by a circular arc, and the concavely arcuate root portion of the belt tooth is described by a circular arc having a radius of curvature slightly greater than that of the circular arc of the convexly arcuate tip portion of the pulley tooth.

6. A toothed belt power transmission system according to claim 1, wherein at the onset of meshing engagement between one belt tooth and a mating pulley tooth, the convexly arcuate tip portion and concavely arcuate root portion of the belt tooth are in sliding contact with the concavely arcuate root portion and convexly arcuate tip portion, respectively, of the pulley tooth so that the confronting engagement surfaces of the belt tooth and pulley tooth partially separate from each other to define therebetween said gap, said gap being open at opposite ends in the transverse direction of the toothed belt.

7. A toothed belt power transmission system according to claim 6, wherein the crest of the belt teeth comprises a flat surface.

8. A toothed belt power transmission system according to claim 6, wherein the crest of the belt teeth has a dimple so as to facilitate elastic deformation of the belt tooth when the belt tooth comes in complete mesh with the mating pulley teeth.

9. A toothed belt power transmission system according to claim 6, wherein the convexly arcuate tip portion and concavely arcuate root portion of the belt tooth merge together without forming an angle therebetween, and the concavely arcuate root portion and convexly arcuate tip portion of the pulley tooth merge together without forming an angle therebetween.

10. A toothed belt power transmission system according to claim 9, wherein the convexly arcuate tip portion of the pulley tooth is described by a circular arc, and the concavely arcuate root portion of the belt tooth is described by a circular arc having a radius of curvature slightly greater than that of the circular arc of the convexly arcuate tip portion of the pulley tooth.

\* \* \* \* \*

UNITED STATES PATENT AND TRADEMARK OFFICE
CERTIFICATE OF CORRECTION

PATENT NO. : 6,575,862 B2  Page 1 of 1
DATED : June 10, 2003
INVENTOR(S) : Masaki Miyaji It is certified that error appears in the above-identified patent and that said Letters Patent is hereby corrected as shown below:

<u>Title page,</u>
Item [30], Foreign Application Priority Data, should read as follows:
-- [30]   Foreign Application Priority Data
    Feb. 14, 2000        [JP]   ………………………..2000-034644 --

Signed and Sealed this

Thirteenth Day of January, 2004

JON W. DUDAS
*Acting Director of the United States Patent and Trademark Office*